UNITED STATES PATENT OFFICE.

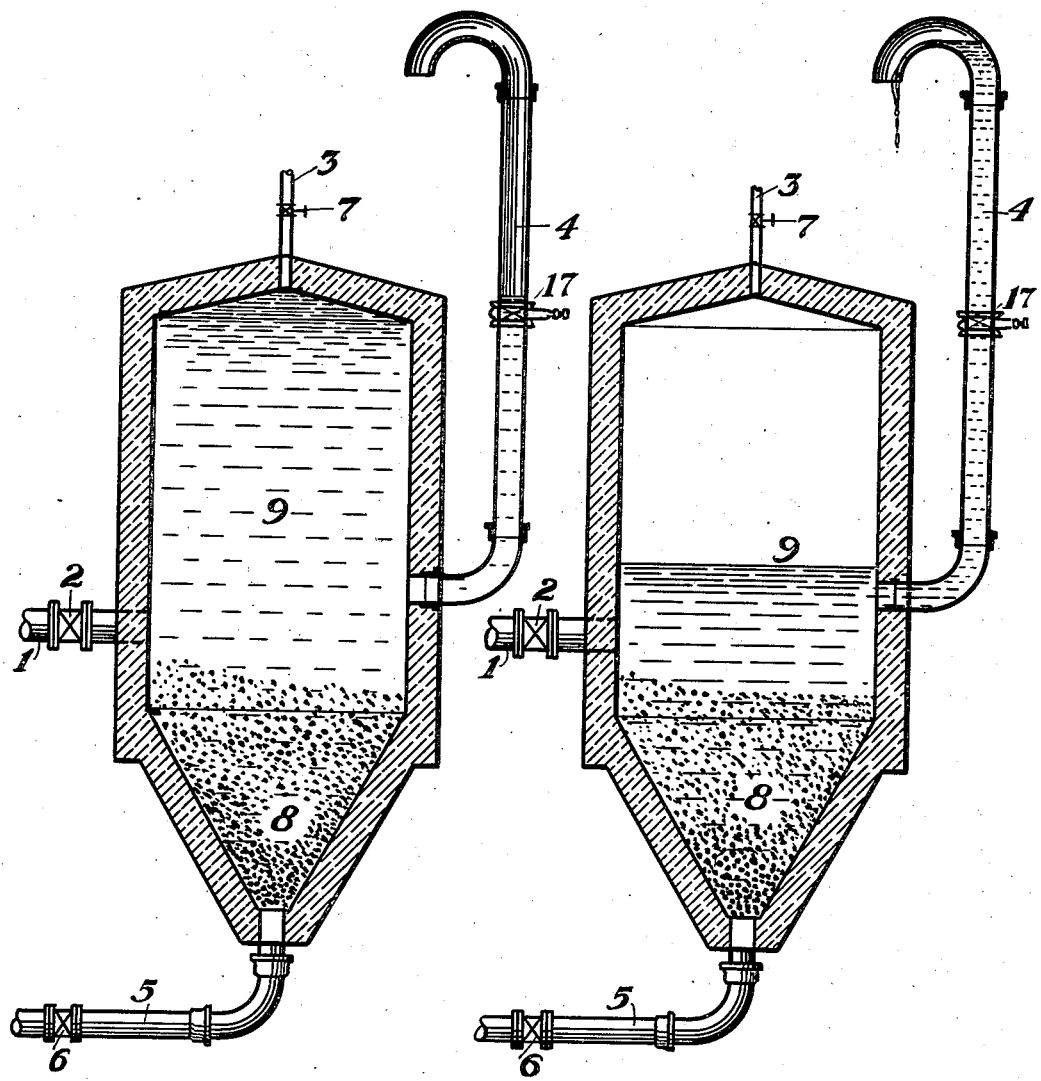

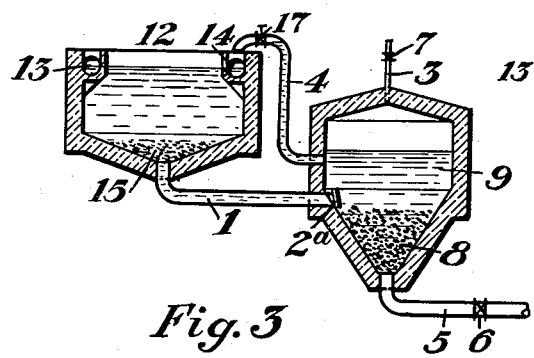
Fig. 3
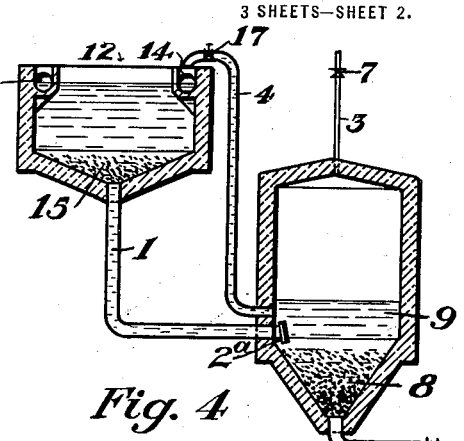
Fig. 4
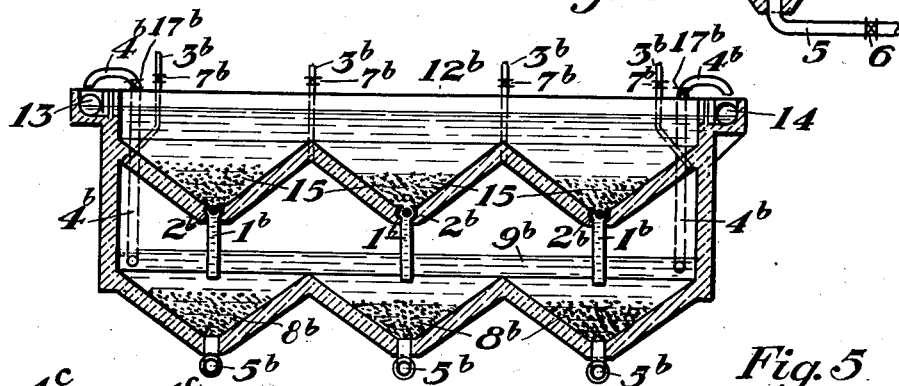
Fig. 5
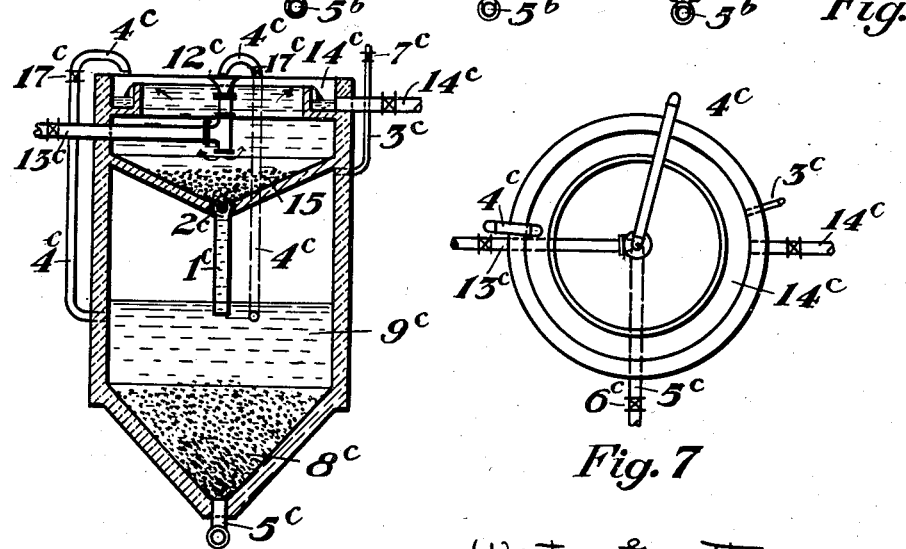
Fig. 6
Fig. 7

WESTON GAVETT, OF PLAINFIELD, NEW JERSEY.

SEWAGE DISPOSAL.

1,420,250.  Specification of Letters Patent.  Patented June 20, 1922.

Application filed October 11, 1921. Serial No. 506,988.

*To all whom it may concern:*

Be it known that I, WESTON GAVETT, a citizen of the United States, residing at Plainfield, in the State of New Jersey, have invented new and useful Improvements in Sewage Disposal, of which the following is a specification, reference being had to the accompanying drawing, forming a part hereof.

This invention relates to the treatment of sewage, trade waste and other liquids of generally similar character which carry in suspension more or less solid matter, which is to be separated from the liquid by sedimentation, and also evolve gas. The invention consists in part in the method of treating the sewage, under which general term will be included all liquids or semi-liquid substances of the general character referred to, and in part in the apparatus in which the improved method may be carried on. In the practice of the invention the material to be treated is subjected during sedimentation and digestion to the pressure of the gas evolved in the process of digestion and under the same pressure the clarified or partially clarified liquid is driven off against a predetermined hydrostatic head from the sedimentary portion or sludge, as the sedimentary portion will be called for convenience. Subsequently, if desired, the sludge may also be driven out of the container under the same pressure. As the gas pressure is reduced, either by escape under control or by escape when the supernatant liquid is driven from the sludge, the place of the supernatant liquid is taken by a fresh quantity of sewage which flows in against the reduced pressure and the operation thus becomes automatic and continuous, the inflow of the sewage, the processes of sedimentation and digestion under the gas pressure, the driving off of the supernatant liquid under the gaseous pressure which is built up during the sedimentation, the reduction of pressure and the inflow of more sewage proceeding in a constantly repeating cycle. Under this method of treatment several advantages result, which may be generally and briefly described as follows:

The supernatant liquid is displaced under the pressure of the gas evolved and without the use of pumps to a head greater than that at which sedimentation goes on and the sludge itself may also be displaced under the same pressure.

The displacement of the liquid, once commenced, goes on during the process of sedimentation and digestion at a rate which is determined by the rate of evolution of gas or at any desired lower rate as determined by the release of gas.

During sedimentation and digestion these processes can be carried on, if the character of the sewage renders desirable, under a pressure which is determined by the hydrostatic head against which the liquid is discharged, whether the tank be shallow or deep, the pressure having the effect in many cases of reducing the formation of scum, that is, of suspended matter floating at the surface, as well as improves the quality of the sludge.

The processes of sedimentation and digestion can be carried on without any previous settling and under such conditions as may be desirable with respect to the handling of the previously settled material.

If more gas is generated during the process of digestion than is required to maintain desired pressure or to effect the discharge of the liquid or the sludge, such surplus gas can be discharged as desired and either allowed to waste or conducted away for combustion or some other useful purpose.

The invention will be more fully explained hereinafter with reference to the accompanying drawings in which it is illustrated in several embodiments and in which—

Figure 1 is a view in vertical central section of a tank which embodies the invention so far as it consists in features of construction and is suited for the practice of the method in which the invention also finds expression, the tank being shown as filled with liquid above the sludge, as at the beginning of the process of digestion.

Figure 2 is a similar view of the same tank, with the supernatant liquid partially discharged under the pressure of gas accumulated in the upper part of the tank.

Figure 3 is a similar view, but on a smaller scale, showing a settling tank in connection with the digestion tank and arranged so as to permit a partial evacuation of the settling tank at each cycle of operation.

Figure 4 is a view similar to Figure 3 but showing the settling tank at a relatively higher level so that it may be evacuated completely into the digestion tank.

Figure 5 is a view, also in vertical section, of a structure in which a settling tank is combined with the digestion tank, directly over the same.

Figures 6 and 7 are respectively a vertical section and a top view showing a combined settling and digestion tank of circular outline.

Figure 8:
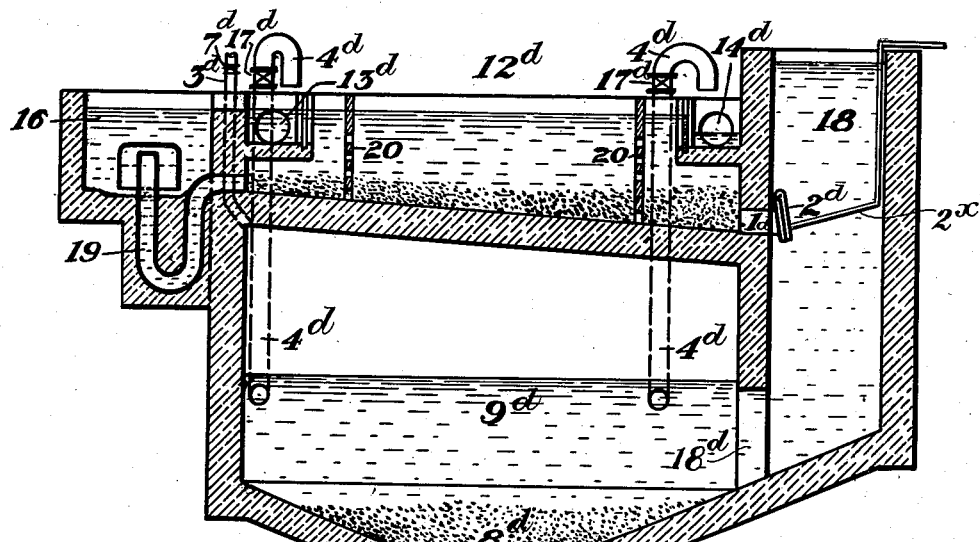
Figure 8 is a view in vertical section of a slightly different form of combined settling and digestion tank, with a flush tank for flushing the bottom of the settling chamber, the contents of the digestion chamber being represented as at the time when gas has accumulated in the digestion tank sufficiently to expel the supernatant liquid therefrom.

In the several figures of the drawings the structure illustrated, so far as the walls of the chambers or tanks are concerned, is shown as of concrete, but it will be understood that any suitable material can be used for the purpose.

In the construction illustrated in Figures 1 and 2 it is assumed that the sewage to be treated is delivered through a supply pipe 1, equipped with a suitable valve 2, into the digestion chamber 9, which preferably has a closed top provided with an outlet pipe 3 which has a valve 7 for controlling or regulating the escape of gas from the digestion chamber. This chamber may be of any suitable form, especially as to its upper part, although its lower portion, as at 8, is preferably conical so as to facilitate, at the proper time, the discharge of the settled portion of the sewage, that is to say, the sludge, through a discharge pipe 5, which is equipped with a suitable valve 6. At a suitable point there is connected to the digestion chamber 9 a liquid discharge pipe 4, which is provided with a discharge valve 17. The point at which the liquid discharge pipe 4 is connected to the chamber 9 will be determined to some extent by the character of the sewage to be treated and particularly by the proportion of liquid and solid or semi-solid matter, as well as by the time during which the sewage is to be kept under pressure. Generally speaking the point of connection of the liquid discharge pipe is located somewhat above the level reached by the sludge while sedimentation and digestion are going on, but well below the top of the chamber. The liquid discharge pipe 4 can be arranged to discharge the liquid at any point and at any height after the valve 17 is opened. Preferably the liquid discharge pipe is carried upward from its point of connection to the chamber 9 to a height such that the hydrostatic head of the liquid in the pipe will be sufficient to retain the liquid in the chamber 9 against the gas pressure which it is desired to maintain on the surface of the liquid, while permitting the discharge of liquid, if so desired, to proceed continuously when the desired gas pressure has once been established in the chamber 9.

In such an apparatus the treatment of the sewage is carried on as follows: The outlet valve 6 being closed and the gas outlet valve 7 being open, to permit the escape of the trapped air, and the liquid outlet valve 17 being also closed, or open as desired, the sewage to be treated is admitted through the supply pipe 1 into the chamber 9 until the chamber is filled completely or to such extent as may be desired. Then, the inlet valve 2 and the gas outlet valve 7 being closed, sedimentation and digestion are allowed to proceed within the chamber. As digestion goes on, more or less gas is evolved, accumulating in the upper part of the tank and creating a pressure under which digestion is continued, such pressure being regulated as desired by opening the valve 7 so as to permit some of the gas to escape, either as waste or to be conducted away to some place of use or storing. The liquid outlet valve 17, in the liquid discharge pipe 4 is opened either when the inlet valve 2 has been closed or at some time later according to the conditions under which digestion is to proceed. When digestion has proceeded for such time as is desired, the valve 17 if not open at the beginning is opened and the gas pressure on the surface of the liquid in the chamber forces the liquid out through the discharge pipe 4 against whatever hydrostatic head is maintained in the pipe, such discharge of the liquid continuing until the desired quantity of the supernatant liquid has been displaced. Meanwhile the gas outlet valve 7 is opened or closed as conditions require. If now it be desired to discharge all of the remaining liquid and the sludge the valves 7 and 17 may be closed and the valve 6 opened, the gas pressure within the chamber facilitating the complete and rapid avacuation thereof. It may be, however, that the sludge is to be permitted to remain in the chamber for a time and in that event the chamber is refilled with sewage and the cycle of operations is continued as before.

In the embodiment of the invention illustrated in Figures 3 and 4 the digestion chamber 9, provided as before with an inlet pipe 1, a gas discharge pipe 3 and valve 7, and liquid discharge pipe 4, with valve 17, is arranged to receive the sewage from a settling tank 12, which may be placed either low or high with respect to the digestion tank 9. If the settling tank is placed low, as shown in Figure 3, it is obvious that only a portion of its contents can be discharged into the digestion tank at each operation, while if placed high, as shown in Figure 4, the entire contents of the settling tank can be discharged into the digestion tank at each operation. The supply pipe 1 is provided with a check valve $2^a$ which permits the flow of sewage from the settling tank into the digestion tank when the pressure in the digestion tank is less than the head under which the sewage flows, and prevents the driving back of liquid from the digestion tank into the settling tank. The settling tank is shown as provided with an inlet 13 and with an outlet 14, for supernatant liquid, into which the supernatant liquid may be discharged from the digestion tank 9 through the discharge pipe 4.

In the embodiment of the invention illustrated in Figure 5 the settling tank $12^b$ is combined in the same structure with the digestion tank $9^b$ and is superimposed upon the digestion tank. The digestion tank is formed with several sludge pockets $8^b$ and is provided with corresponding sludge outlets $5^b$, and with a plurality of liquid discharge pipes $4^b$ and gas outlet pipes $3^b$, each provided with a valve $7^b$. The settling chamber $12^b$ is likewise formed with a plurality of sludge pockets 15, each of which has a discharge pipe $1^b$ provided with a check valve $2^b$, each discharge pipe (constituting the supply pipe for the corresponding part of the digestion tank) being preferably extended well downward into the digestion tank, each liquid discharge pipe $4^b$ being shown as extended upward, provided with a valve $17^b$ and arranged to discharge in one case into the inlet 13 and in the other case into the outlet 14 of the settling tank.

The structure shown in Figures 6 and 7 is also a combination of a digestion tank and a superimposed settling tank, circular in cross section. The digestion tank $9^c$ has a sludge pocket $8^c$ with an outlet $5^c$ and valve $6^c$, liquid discharge pipes $4^c$ with valves $17^c$, and a gas outlet $3^c$ with a valve $7^c$. The settling tank $12^c$ has an outlet pipe $1^c$, with a check valve $2^c$, an inlet $13^c$ and an outlet $14^c$.

Figure 9:
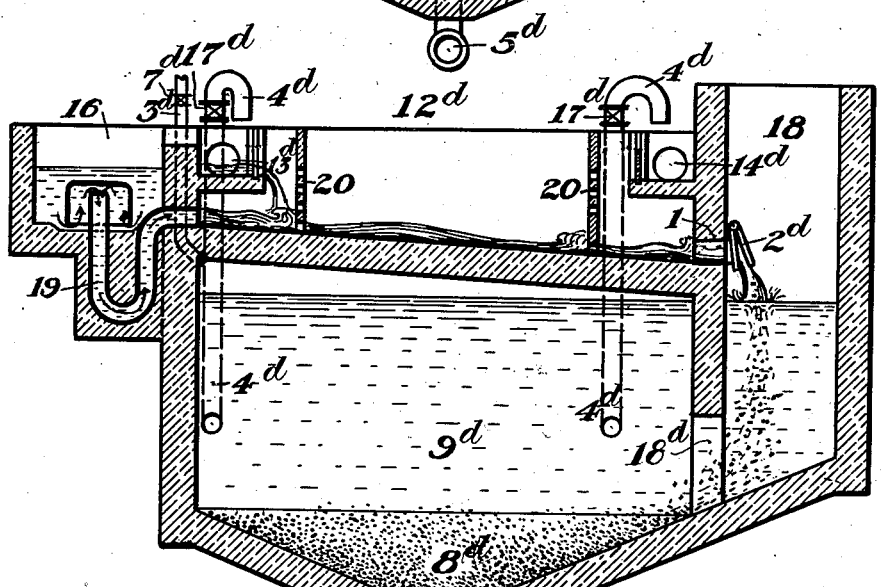
Figure 9 is a similar view with the contents of the tank represented as at the time when the settling tank has been emptied into the digestion tank and the bottom of the settling tank is being flushed.

The combination structure shown in Figures 8 and 9 includes a digestion tank $9^d$ having a sludge pocket $8^d$ with an outlet $5^d$, liquid discharge pipes $4^d$ with valves $17^d$ and a gas discharge pipe $3^d$ with a controlling valve $7^d$. At one end of the structure is a communicating and pressure chamber 18 into which the material to be treated is discharged from the settling chamber $12^d$ through a discharge opening $1^d$, provided with a check valve $2^d$. The chamber 18, at its lower end, communicates with the digestion chamber $9^d$ through a suitable opening $18^d$. The bottom of the settling chamber $12^d$ is preferably inclined toward the discharge outlet $1^d$, as shown, and at the side opposite the chamber 18 there is formed a flush tank 16, which communicates with the settling chamber $12^d$ near the highest point of the bottom, preferably through a flushing siphon 19. Perforated baffle plates 20 may be disposed in the settling tank to control somewhat the deposit of sludge. The settling tank may be filled through an inlet $13^d$ and the displaced liquid may be discharged from the settling tank through a suitable outlet $14^d$. The check valve $2^d$ can be locked in its closed position, if desired, by any suitable means such as a brace $2^x$, shown in Figure 8. In the practice of the invention in this form of apparatus the settling chamber $12^d$ is first filled with the sewage to be treated, the check valve $2^d$ being closed. While settling is going on and the introduction of sewage is continued the supernatant liquid may escape through the outlet $14^d$, filling the flush chamber 16 at the same time. When the settling has continued as long as desired the check valve $2^d$ is released and the contents of the chamber $12^d$ are discharged into the communicating and pressure chamber 18, passing thence, through the opening $18^d$, into the digestion chamber $9^d$. As the last of the contents of the settling chamber $12^d$ escapes therefrom the flush chamber 16 is drawn open through the flushing siphon 19 and the bottom of the settling chamber $12^d$ is flushed, all of the remaining sludge being carried into the chamber 18 and thence into the chamber $9^d$. The emptying of the settling chamber $12^d$ is repeated as may be desired until the digestion chamber $9^d$ is sufficiently full. As digestion proceeds in the chamber $9^d$ and the gas accumulates in the upper part thereof while the sludge settles at the bottom, the supernatant liquid is displaced by the gas pressure, against the constantly increasing head in the pressure chamber 18 and in the liquid discharge pipes $4^d$, the supernatant liquid escaping through the pipes $4^d$ when the valves $17^d$ are open. It is obvious that when the liquid in the chamber 18 has risen above the level of the liquid in the chamber $12^d$ the check valve $2^d$ would be closed and held closed by the pressure of the liquid in the chamber 18. This condition would continue until the gas pressure in the chamber $9^d$ is relieved, as by opening the valve $7^d$. Then, the level of the liquid in the chamber 18 being lowered, the check valve $2^d$ would open and permit the contents of the chamber $12^d$ to be discharged into the chamber 18 and thence into the chamber $9^d$. The operation would thus become in part automatic.

Various other forms of apparatus in which the invention can be practiced and embodied will suggest themselves in view of the foregoing and it is to be understood that except as pointed out in the accompanying claims the invention is not restricted with respect to the form of apparatus employed.

I claim as my invention:

1. An improvement in the treatment of sewage which consists in subjecting the sewage during digestion to the pressure of gas generated by digestion, and under the pressure of such gas driving off the supernatant liquid from the sludge.

2. An improvement in the treatment of sewage which consists in subjecting the sewage during digestion to the pressure of gas generated by digestion, under the pressure of such gas driving off the supernatant liquid from the sludge, and subsequently removing the sludge.

3. An apparatus for the treatment of sewage comprising, a closed digestion chamber having an inlet for the sewage, a pocket for the sludge, and a liquid discharge pipe connected to the chamber at a point below the top and above the sludge level and extended upwardly above the chamber to create hydrostatic head against which the supernatant liquid is displaced by the gas of digestion in the upper part of the chamber.

4. An apparatus for the treatment of sewage comprising a closed digestion chamber having an inlet for the sewage, a valve controlled gas outlet, and a liquid discharge pipe connected to the chamber at a point below the top and above the sludge level and extended upwardly above the chambers to create hydrostatic head against which the supernatant liquid is displaced by the gas of digestion in the upper part of the chamber.

5. An apparatus for the treatment of sewage comprising a closed digestion chamber having an inlet for the sewage and a liquid discharge pipe connected to the chamber at a point below the top and above the sludge level and extended upwardly to create hydrostatic head against which the supernatant liquid is displaced by the gas of digestion in the upper part of the chamber and a settling chamber arranged to deliver its contents into the digestion chamber.

6. An apparatus for the treatment of sewage comprising a closed digestion chamber having an inlet for the sewage and a liquid discharge pipe connected to the chamber at a point below the top and above the sludge level and extended upwardly to create hydrostatic head against which the supernatant liquid is displaced by the gas of digestion in the upper part of the chamber, and a settling chamber superimposed on the digestion chamber and having its outlet arranged to discharge into the digestion chamber.

7. An apparatus for the treatment of sewage comprising a closed digestion chamber having an inlet for the sewage and a liquid discharge pipe connected to the chamber at a point below the top and above the sludge level and extended upwardly to create hydrostatic head against which the supernatant liquid is displaced by the gas of digestion in the upper part of the chamber, a settling chamber and a communicating chamber arranged to receive the sewage from the settling chamber and to discharge the same into the digestion chamber at a point near the bottom.

8. An apparatus for the treatment of sewage comprising a closed digestion chamber having an inlet for the sewage and a liquid discharge pipe connected to the chamber at a point below the top and above the sludge level and extended upwardly to create hydrostatic head against which the supernatant liquid is displaced by the gas of digestion in the upper part of the chamber, a settling chamber having an inclined bottom and arranged to discharge its contents into the digestion chamber and a flush chamber arranged to be filled by overflow from the settling chamber and communicating with the settling chamber near its bottom to discharge its contents across the bottom of the settling chamber.

9. An apparatus for the treatment of sewage comprising a closed digestion chamber having an inlet for the sewage and a liquid discharge pipe connected to the chamber at a point below the top and above the sludge level and extended upwardly to create hydrostatic head against which the supernatant liquid is displaced by the gas of digestion in the upper part of the chamber, a settling chamber and a communicating chamber arranged to receive the contents of the settling chamber and to discharge the same into the digestion chamber near its bottom, the settling chamber discharging into the communicating chamber through a check valve.

This specification signed this 8th day of October A. D., 1921.

WESTON GAVETT.